Figure 1:
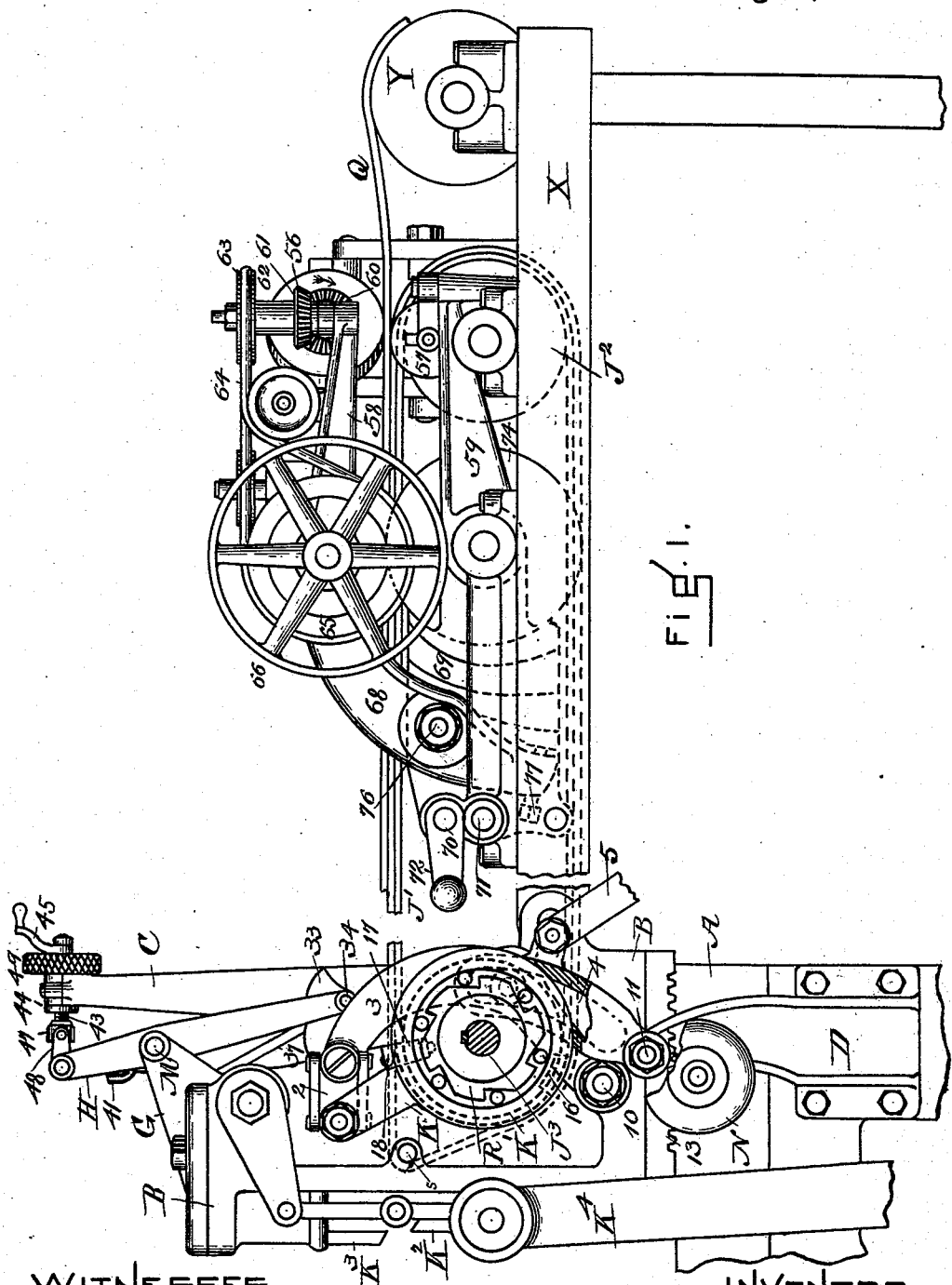

(No Model.) 6 Sheets—Sheet 1.
H. B. STEELE.
MACHINE FOR CUTTING BOOT OR SHOE SOLES.
No. 524,286. Patented Aug. 7, 1894.

WITNESSES
INVENTOR
Herbert B. Steele (No Model.)

6 Sheets—Sheet 2.

H. B. STEELE.
MACHINE FOR CUTTING BOOT OR SHOE SOLES.

No. 524,286.

Patented Aug. 7, 1894.

WITNESSES
A. J. Burrow
F. J. Cunningham

INVENTOR.
Herbert B. Steele (No Model.) 6 Sheets—Sheet 5.
H. B. STEELE.
MACHINE FOR CUTTING BOOT OR SHOE SOLES.

No. 524,286. Patented Aug. 7, 1894.

WITNESSES.
A. J. Burrow,
T. J. Cunningham

INVENTOR
Herbert B. Steele.

(No Model.) 6 Sheets—Sheet 6.
H. B. STEELE.
MACHINE FOR CUTTING BOOT OR SHOE SOLES.

No. 524,286. Patented Aug. 7, 1894.

WITNESSES
INVENTOR.
Herbert B. Steele

UNITED STATES PATENT OFFICE.

HERBERT B. STEELE, OF MEDFORD, ASSIGNOR TO ROBERT D. EVANS AND JOHN S. LOCKWOOD, OF BOSTON, MARGARET E. KNIGHT, OF SOUTH FRAMINGHAM, AND DAVID C. MARR, OF HYDE PARK, MASSACHUSETTS.

MACHINE FOR CUTTING BOOT OR SHOE SOLES.

SPECIFICATION forming part of Letters Patent No. 524,286, dated August 7, 1894.

Application filed April 19, 1893. Serial No. 471,030. (No model.)

*To all whom it may concern:*

Be it known that I, HERBERT B. STEELE, of Medford, in the county of Middlesex and State of Massachusetts, have invented certain new and useful Improvements in Machines for Cutting Boot or Shoe Soles and other Articles of Curvilinear Outlines, of which the following is a specification.

The improvements relate to machines of the class described and shown in Letters Patent No. 444,982, and dated January 20, 1891, and I have illustrated them as applied to a machine of substantially the same construction as therein shown.

My invention consists in novel devices by which the stock feeding mechanism will be automatically controlled and which are caused to operate by reason of the peculiarities of formation of the stock itself, whereby any ornamental or distinguishing stamp or design which may have been produced upon the strip or sheet of material before it is fed to the cutting machine, will be placed centrally or otherwise definitely as desired upon the supporting pattern in accordance with which it is to be cut.

In the machine described in the Letters Patent above-mentioned, the automatic intermittent movement of the feeding apron is a constant distance, the feed-roll being operated by a cam. When cutting material such as strips of unvulcanized india-rubber upon which a stamp or design has been produced at intervals, it has been necessary for an attendant to stand at the machine and by means of a hand-wheel upon the shaft of the feed-roll or other mechanism employed, so adjust or regulate the feed as to locate each design over the center of the supporting pattern. This was required because of the irregularity of the positions of such designs due to the imperfections of the machines by which they were produced and to the changes brought about by shrinkage or otherwise, in the stock, between the time when it was calendered and the time when it was fed to the cutting machine. The adjustment of these designs upon the pattern by the attendant was necessarily inaccurate, particularly if the machine was run at a high rate of speed.

My improvements in the feeding mechanism automatically do the work heretofore attempted by the attendant and practically with substantial accuracy. The operation of the feeding cam upon the feed-roll being interrupted by the automatic release of a driving-clutch from said roll and the engagement of a brake-clutch therewith, which is effected by a tripping-pawl, acted upon by projections or depressions formed upon the stock, which is being cut, at regular intervals from each stamp or design as hereinafter described.

Further improvements upon the said machine are the attachments by which the strip of material is accurately guided thereto and trimmed to uniform width before it passes to the blank-cutting knives.

Figure 2:
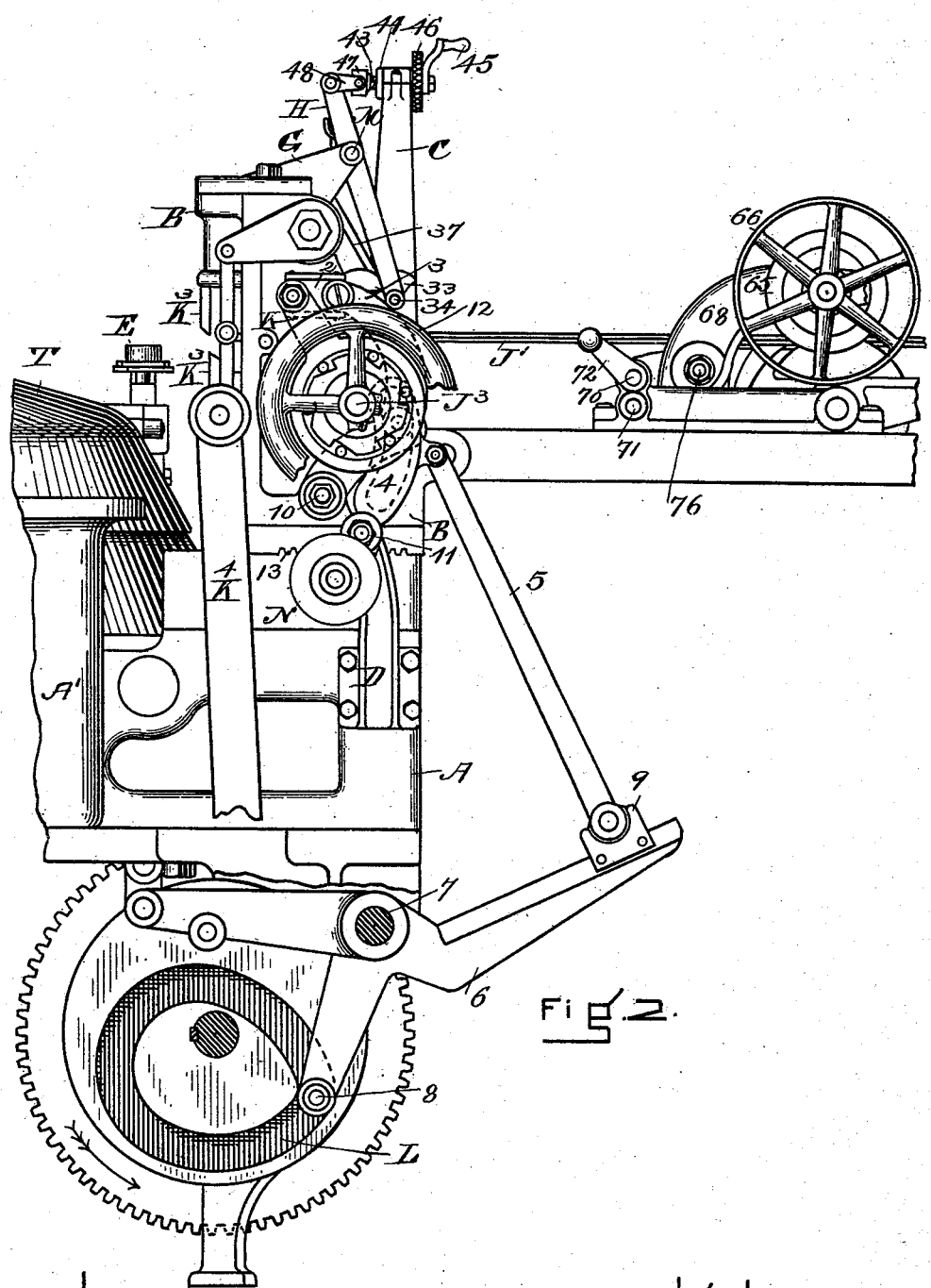
Figure 3:
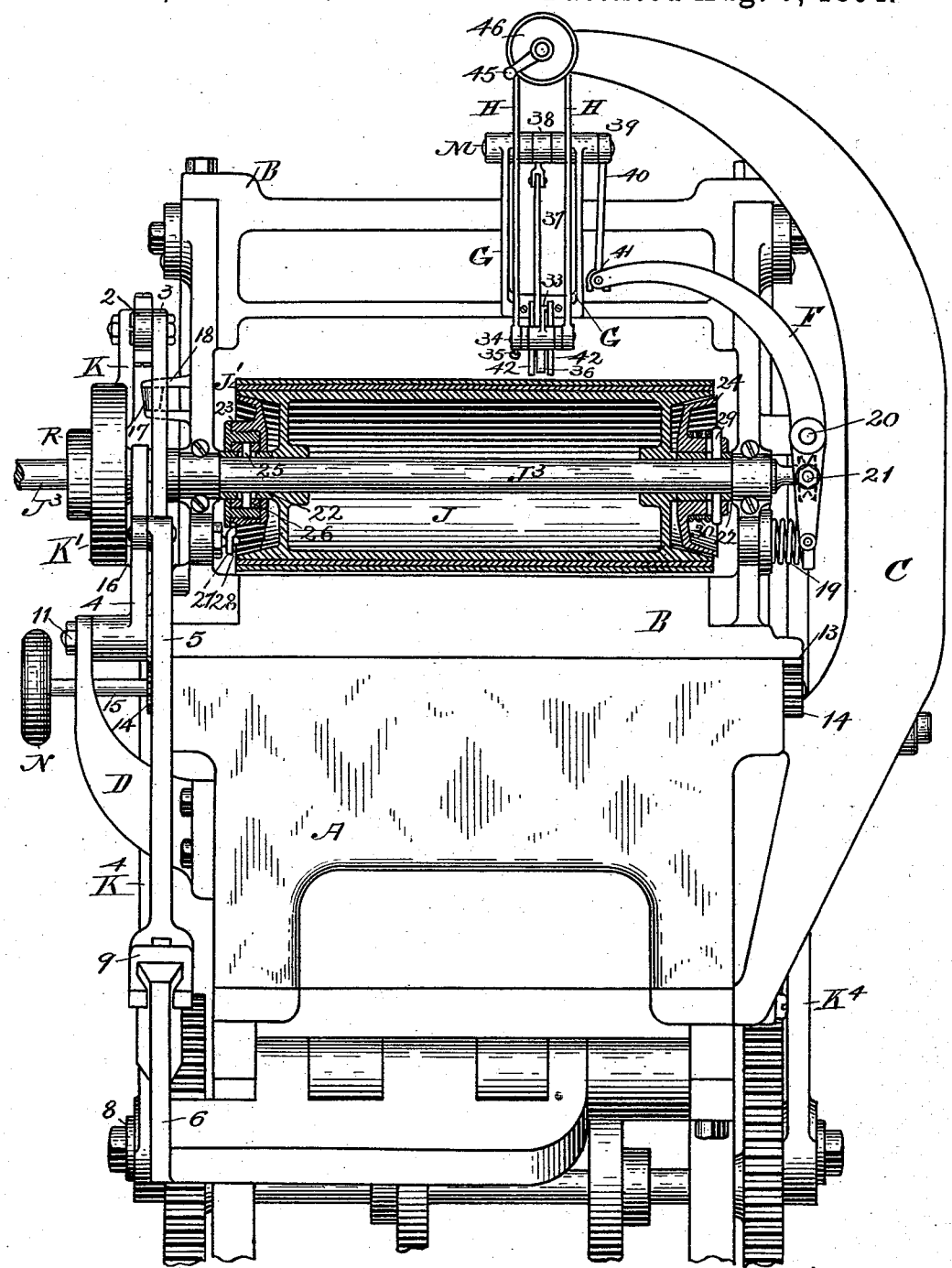
Figure 4:
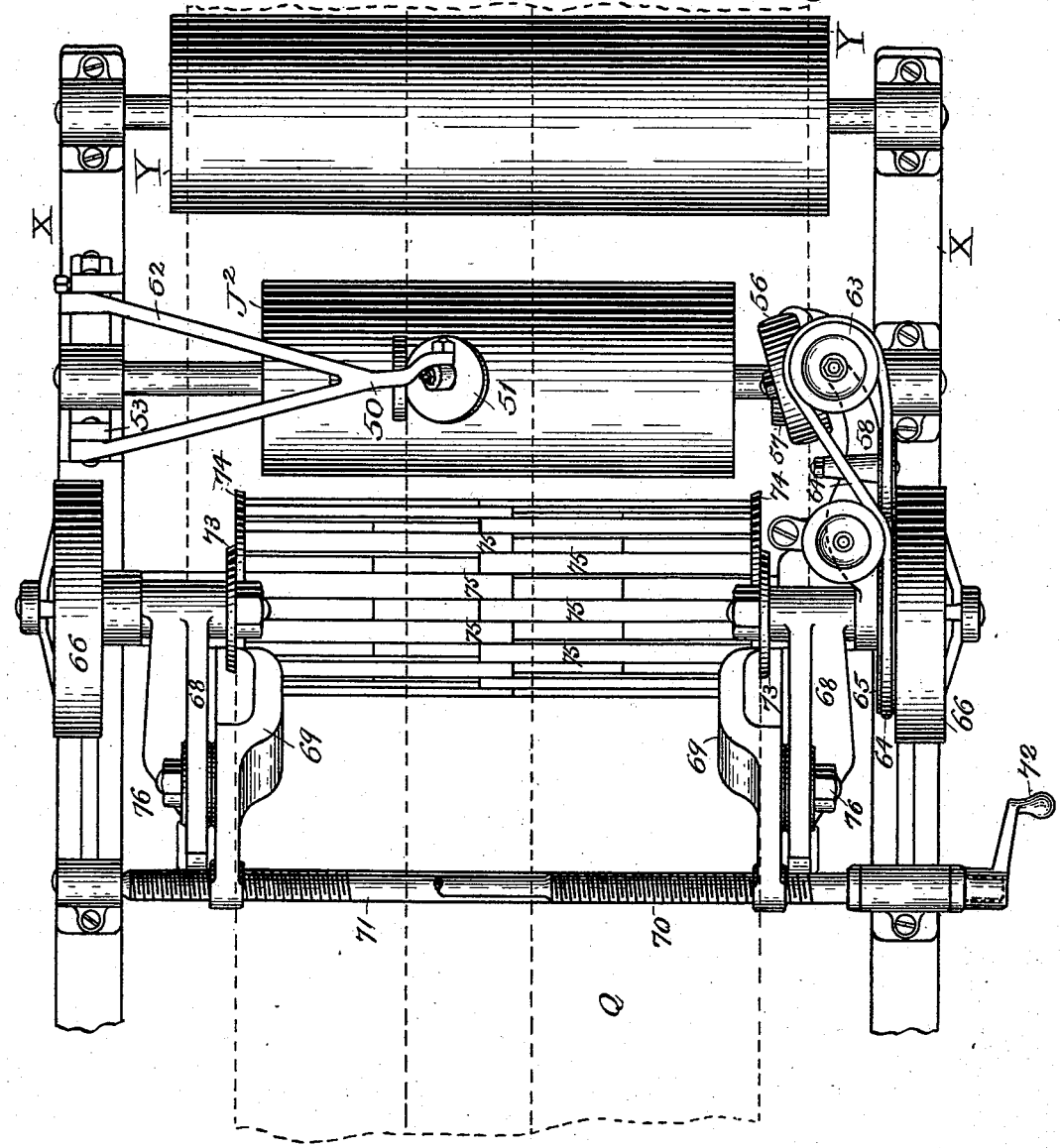
Figure 8:
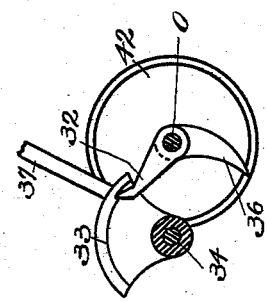
Figure 9:
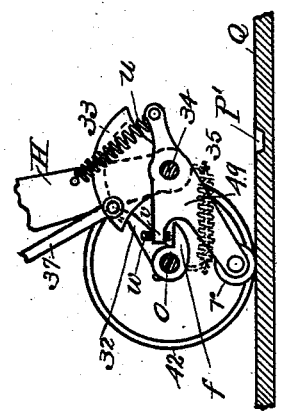
Figure 5:
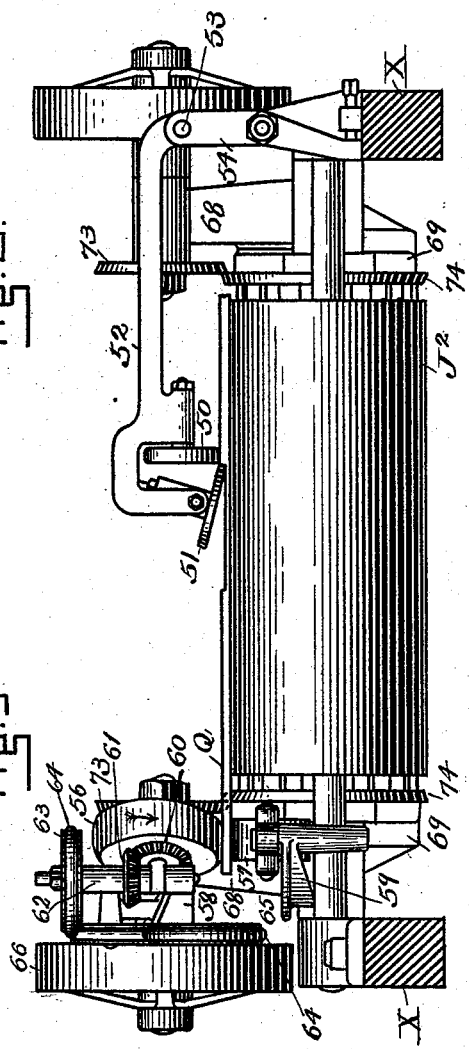
Figure 7:
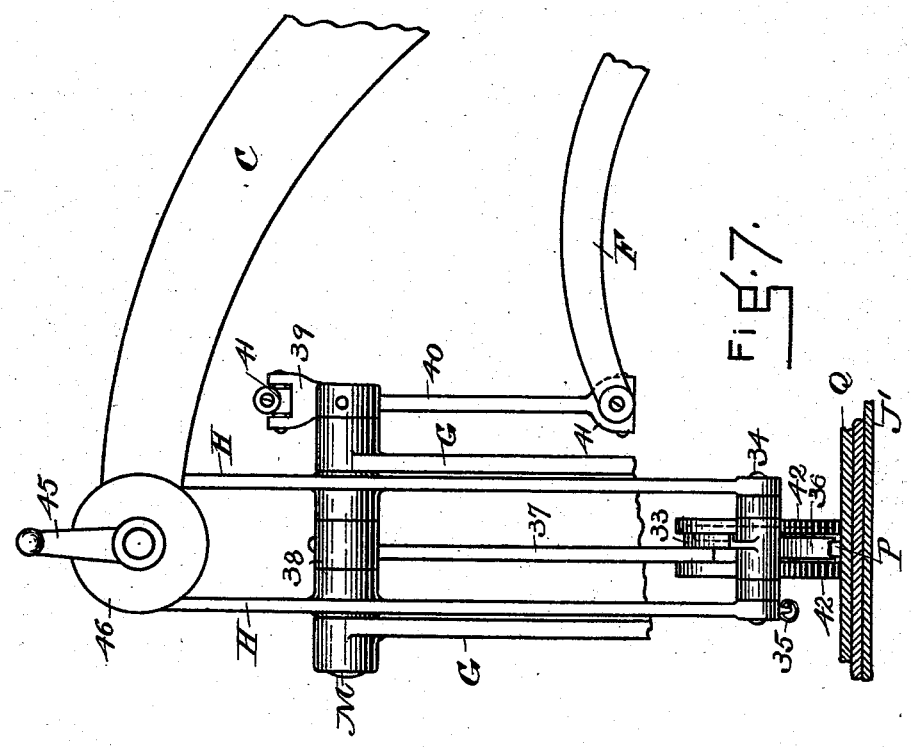
Figure 6:
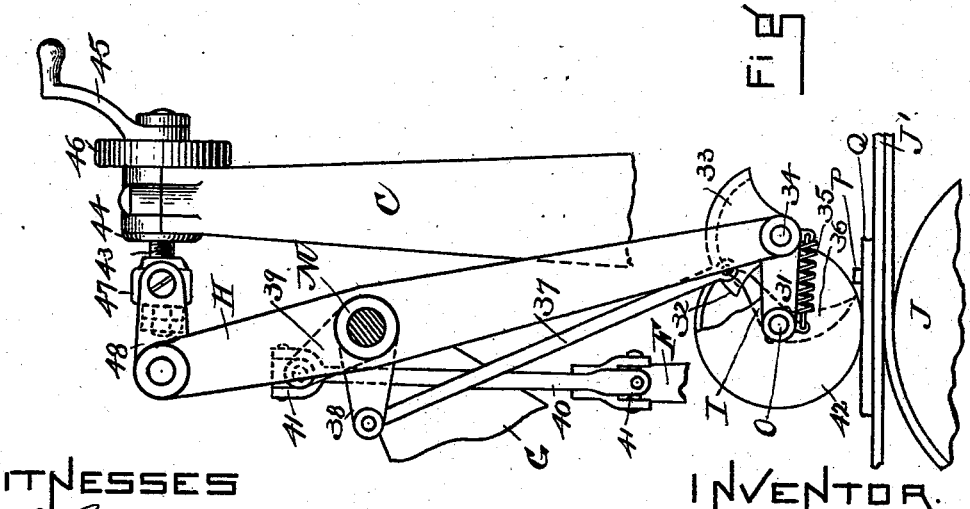

In the drawings accompanying this specification: Figure 1, is a side elevation of my improved feed regulator, and strip trimmer with the parts of the machine to which they are attached. Fig. 2, is a side elevation of the same parts showing the feed operating cam and intermediate levers; one of the form determining patterns and a portion of its supporting turret. Fig. 3, is an end elevation of the cutting machine, with the feeding roll in section and the tripping or feed regulating devices above it. Fig. 4, is a plan view of the strip trimming mechanism. Fig. 5, is an end elevation of such mechanism with the stock supporting roll shown at the top of the sheet in Fig. 4, removed. Fig. 6, is an enlarged side elevation of the feed regulating attachments, apart from the machine. Fig. 7, is a front elevation of the same. Fig. 8, is a sectional elevation of the tripping devices viewed from the reverse side of Fig. 6. Fig. 9, illustrates the construction of the tripping devices which may be used when depressions instead of projections are made upon the sheet of material.

Similar letters or figures are used to designate the same part of the machine, in the several sheets of drawings, and thus referring to them—

A, A' are parts of the frame of the cutting machine.

B is an adjustable frame or cross-head which sustains the blank-cutting knives and the feed-roll, the improved feed regulating devices being supported upon a bracket G, attached to the cross-head portion of the frame B.

J′, is the stock-feeding apron, J the feeding roll which intermittently moves the apron toward the machine and J² the other apron supporting roll.

As it is desirable to carry the stock as near to the blank cutting knives as possible, I use a double feeding apron and make the outer one longer than the inner one, and pass it over a small roll s, hung in bearings in the front portion of the frame B.

Upon the shaft J³, of the roll J, is a ratchet-lever K, having a disk portion K′, which is free to turn upon said shaft J³, but which by means of a ratchet R, keyed thereon will turn the shaft when the ratchet-lever is turned in a direction toward the cutting machine. The ratchet-lever K, is caused to reciprocate by a cam-groove L, through its connection therewith by means of a link 2, crooked lever 3, slotted lever 4, connecting lever 5, and cam lever 6, pivoted at 7 and having a cam-wheel 8, at its lower end. The length of the stroke produced by the cam L, can be varied by changing the position of the saddle 9, upon the outer end of the cam lever 6. The lever 3, is pivoted at 10 and lever 4 at 11, in the bracket D. The feed-roll J, may also be operated in one direction by the hand-wheel 12, upon the end of the shaft J³.

The portion B, of the frame rests upon guides on the frame A and can be adjusted thereon toward or from the machine by means of racks 13 attached to the bottom of the part B, and into which pinions 14, mesh, and these pinions are operated by a hand-wheel N on the end of the pinion shaft, 15.

The movement of the feed-roll J by the cam and levers just described, when they alone are employed for the purpose, will always be the same distance, irrespective of the material which is being fed.

My improved automatic feed regulating devices consist in making the roll J, loose upon its shaft J³, which is given a small longitudinal movement in its bearings. This is accomplished, in one direction, by a cam surface 16 projecting from the inner side of the disk of the ratchet-lever K, which comes into contact with a friction roll 17, hung in a stud 18 upon the side of the frame B, when the said ratchet-lever K is turned back, away from the machine about one third of a revolution. The shaft J³ is moved in the other direction by the action of a spring 19, which bears against the lower end of a lever F, which is pivoted to the frame of the machine at 20, and to which one end of said shaft J³ is attached at 21. The roll J is prevented from moving longitudinally upon its shaft, by sleeves or collars 22, thereon, interposed between its bearings and the hubs of that roll.

Upon the shaft J³ and within the recessed ends of the drum J, are two frusto-conical disks, 23, 24; the one 23 at the end next to the ratchet-lever K serves as a brake to stop the roll J and prevent its rotation, as soon as the driving disk or clutch 24, at the other end is released. The brake disk 23, is loose upon the collar 22 and is caused to move longitudinally thereon a short distance, by a pin 25 projecting from the shaft J³ into a ring 26 upon the collar 22 and within the disk 23, which ring is made in two parts so that it may be readily put in place. The disk 23, is prevented from rotating by means of a projecting finger 27, which engages with a lug 28 upon the frame of the machine. The collar 22 is slotted to allow the pin 25 to move back and forth sufficiently for the proper operation of the said brake-disk 23, which is effected by the engagement of the pin 25 with the ring 26. This brake-disk is caused to bear against the rim of the roll and stop it, when the shaft J³ is moved to the right, (Fig. 3,) by the operation of the spring 19, when released by the tripping device which is connected with the lever F. The brake 23 is withdrawn and the driving disk 24 is caused to bear upon the opposite end of the roll J, by the action of the friction roller 17 upon the cam surface 16 projecting from the ratchet-lever K, heretofore mentioned.

The driving disk 24 is free to slide a short distance longitudinally upon the collar 22 at that end of the shaft, but is caused to rotate with the shaft J³, by a pin 29 projecting from the shaft into slots in the hub of the said driving-disk. And for the purpose of giving an elastic pressure between the driving-disk and the rim of the roll J, a spring 30, is placed between the pin 29 and the disk 24.

At the time when the driving disk 24, is pressed into contact with the roll J, by the operation of the cam 16 against the friction roll 17, the ratchet-lever K is at the end of its backward throw, and in order that the disk may continue in contact with the roll J, after the cam 16 and friction roll 17 have been separated, and during the requisite portion of the period of forward movement of the ratchet-lever, so that the feed-roll will be turned with the shaft J³, and the necessary length of the strip of stock be fed between the blank-cutting knives, a locking-device is provided to hold the said disk against the action of the spring 19. The locking device with the several parts employed to connect it with the crooked lever F, are supported by a bracket G which projects from the cross-head of the frame B.

The locking-device specifically, consists of a pawl I, see Figs. 6 and 7, made fast upon a pivot O in arms 31. The upper end 32, of this pawl, acts like the sear in a gun-lock to hold up the sector-shaped tumbler 33, which turns upon a pivot 34. There being a notch in a projecting rim upon one side of said sector (see Fig. 8) in which the sear 32 is normally held by the action of a spring 35, one end of which is attached to an eye made fast to the pivot O, and the other end to an eye fastened to a bearing of pivot 34. The lower end 36, of the pawl I, serves as a trip to disengage the sear 32, from the notch in the sector 33, when the said trip is acted upon by projections upon the stock as will be described hereinafter. These locking and unlocking devices are supported by a two part hanger H, which is held by a pivot M, in the bracket G. The sector 33 is connected with the crooked lever F, by the several parts as follows:—The lower end of a rod 37, is pivoted to the sector 33, and its upper end to a crank arm 38, which is fixed upon the pivot M; fastened to the same pivot, is an arm 39, and this is connected with the upper end of the lever F by a rod 40, provided with a universal joint 41 at each end.

While the sear 32, is in the notch in the sector 33, the several connecting parts above mentioned between it and the spring 19, will be held under stress by that spring, and when the stock is being fed to the machine, as soon as one of the projections P upon its surface, comes into contact with the trip 36 it will cause the pawl I, to turn with its pivot O and thus withdraw the sear 32, from the notch in the tumbler 33, leaving the spring 19, free to pull the shaft $J^3$, to the right and with it the driving disk 24, thereby releasing it from the drum J, also by the same movement bringing the brake disk 23 into contact with the other end of the said drum, immediately stop its revolution, and the feeding of the stock. By the same action of the spring 19 the locking devices and the several connecting parts mentioned will be changed in position. The lower end of the lever F will be forced outward and its upper end pulled down and with it the parts 40, 39, 38, the rod 37 will be pushed down and turn the sector 33 to the left, Fig. 6, upon its supporting pivot. Thus the roll will be held stationary by the brake-clutch until the ratchet-lever K has again moved backward sufficiently to bring the cam 16 in contact with the friction roll 17, thereby drawing the shaft $J^3$ to the left again, (Fig. 3) compressing the spring 19 and returning the locking devices to the position illustrated in Figs. 6 and 7, where they will be held by the pawl I, until released by the trip 36 coming into contact with the next projection upon the surface of the material.

Upon the pivot O, I place two rollers 42, one upon either side of the pawl I, to hold it in proper position in relation to the surface of the stock, and also, when operating upon unvulcanized india-rubber, to hold it firmly upon each side of the projections P, upon the upper surface of the sheet of stock Q, during the time that the projection is acting upon the trip 36.

When the frame B is changed in its position with relation to the pattern E for the purpose of varying the size of the blank which is cut, the locking and tripping devices will be adjusted automatically toward or from the blank cutters, as hereinafter more particularly set forth, but small adjustments may be made by means of a screw 43, which is held in a sleeve nut, 44, supported in the bracket C. The screw 43 may be turned in the nut 44 by the crank 45, or the nut 44 may be turned by the knurled wheel 46. The end of the screw 43 is held in the block 47, by a shoulder upon one side thereof and a nut upon the other, the said block being pivotally connected to the upper end of the hanger H by links 48. Thus when the screw 43 is turned one way or the other the upper end of the hanger H, will be moved to and fro, turning on the pivot M, and the longer end of the hanger arms being below the pivot, a very small movement of the upper end will cause a material difference in the position of the locking and tripping devices at the lower end.

In Fig. 9 is illustrated a convenient modification of the tripping devices, which will be acted upon by depressions in the stock instead of projections, for automatically stopping the feed-roll. In this construction the trip consists, of a piece 49, hung freely on the pintle 34, and having a small roller $r$, held in its lower end. This roller is kept firmly upon the stock by a spring $u$, attached to the other end of the piece 49, which projects beyond the pintle 34.

In place of the trip 36, (shown in Fig. 8) a finger $f$, is fastened to the pivot O, over which is a projecting portion $v$, of the piece 49, provided with a screw $w$, by which to regulate the length of the arc through which the piece 49 may turn upon the pintle 34, before it acts upon the finger $f$, and withdraws the sear 32, from the sector 33, when the roller $r$ drops into a depression P'; this operation being insured by the action of the spring $u$.

In the operation of calendering india-rubber, as the sheets are delivered from the rolls they have ragged uneven edges and when such sheets are to be cut into short pieces or blanks for small articles like shoe soles, it becomes advantageous to trim the sheets to uniform width with straight edges, and also necessary to locate the sheet accurately in a definite position upon the pattern which is to determine the shape of the sole, and the attachments to the cutting machine which I have devised for this purpose are shown in enlarged views, in Figs. 4 and 5, where X is the supporting frame, Y is a roll to facilitate the movement of the untrimmed sheet Q, to the machine; $J^2$ is the outer roll for the feeding apron over which are the two guiding disks 50, 51, which act with drawing rolls hereinafter mentioned, to insure the proper position of a sheet laterally as it is fed forward, when it has been calendered into the shape best suited for shoe soles, that is, thinner at the portion where the shanks will be located than at the heel and sole portions. These guiding disks are journaled at the end of an arm 52, which is pivoted at 53, to a standard 54 projecting from the frame X. The disk 50 stands perpendicularly, and as illustrated bears upon the edge of the heel portion of the stock next to the shank portion. The disk 51, is adjusted so as to hang nearly horizontally, and in such a position that its periphery will bear against the offset produced by the difference in thickness between the heel and shank portion of the sheet, and in this way act as a guide to the sheet, and cause it to be properly directed to the trimming knives and thence to the pattern in the cutting machine. For the purpose of drawing the said offset closely against the disk 51 I support a pair of rolls, 56, 57, one above the other at the ends of brackets 58, 59, and with their axes and that of the roll $J^2$ substantially in the same vertical plane. See Figs. 1 and 4, and in such a position that the edge of the sheet Q will pass between these two rolls; as shown at the left of Fig. 5. The upper roll 56 is driven by bevel gears 60, 61, the latter of which being upon the same sleeve 62, with a grooved pulley 63; this pulley being given motion by a belt 64, which runs over another grooved pulley 65 upon the shaft of one of the trimming cutters, which is driven by a belt upon the pulley 66. The upper roll 56, is set at an angle with the lower roll, that is, with the inner end of its axle turned a little forward of the said vertical plane, at an angle, for instance, of ten or fifteen degrees. Thus when the said roll 56 is rotated in the direction indicated by the arrow it will tend to draw the sheet of material toward that side of the machine and the said offset against the guide-roll 51. Immediately beyond the roller $J^2$ are the trimming cutters, in this instance, circular cutters are employed for the purpose. They are supported in brackets 68, 69, there being a similar pair upon either side of the machine, which are made adjustable toward or from one another by means of screw-rods 70, 71, which are operated by a crank 72. The upper cutters 73, are supported in the brackets 68 and are secured to the shafts of their respective driving pulleys 66. The lower cutters 74, are supported by journals in the lower brackets 69, at either end of a drum, which is intended to assist in supporting the sheet of stock. This drum is made with interlocking tongued and grooved slats 75, in its middle section, in order to readily accommodate itself to the change in the position of the cutters when they are moved toward or from one another, in adjusting them to trim sheets of different width. The cutters 73, 74 of each pair can be adjusted with relation to one another through the movement of the upper brackets 68, which are held upon the lower brackets 69, by bolts 76, and on which the brackets 68 can be turned by the operation of screws 77, at their lower ends. Shown in dotted lines Fig. 1.

Referring to Figs. 1, 2 and 3, the lower knife $K^2$, is moved up and down by means of the connecting rods $K^4$, one upon either side of the machine, which are pivoted at their lower ends to crank disks or gears, substantially as in the machine described in the patent above referred to.

As the machine illustrated is organized, the unlocking or tripping pawl I is located with respect to the blank-cutting knives at a distance therefrom equal to the width of the blank which it is desired to cut. The machine being first regulated for a blank of medium width, with the distance from the blank cutter $K^2$, to the center of the pattern E, equal to one half the width of the blank, the tripping device will be automatically adjusted whenever the frame B is changed in position (by the racks and pinions 13, 14,) for the purpose of cutting a wider or narrower blank.

The automatic adjustment of the locking and unlocking device is as follows: The bracket arm C is attached to the main part of the frame of the machine, and as has been described, the upper end of the hanger H is connected to said bracket C, and will not move toward or from it except by the operation of the screw 43. The said hanger also being connected to the movable frame B by the pivot M, is swung back and forth when the frame B is moved, and in the same direction; but varying in amount in proportion to the difference between the length of the hanger arms above and below the pivot M. Any adjustment needed to meet small variations may be made by turning the screw 43. As heretofore stated, these locking and tripping devices are for the purpose of making the regulation of the feed, automatically dependent upon the movement of the material which is being cut, for the purpose of definitely locating over the pattern any design which may have been produced upon such material, and as illustrated, the tripping or unlocking of the feeding mechanism is effected by the action of projections or depressions on the surface of the stock, upon the trip 36, or 49. I determine the position of these projections or depressions upon the stock which is to be cut, in this machine, by the distance from the center of the pattern E to the trip, when the machine has been adjusted for cutting blanks of a given size, which in accordance with the arrangement above described, will be one and one half times the width of such blanks. Consequently, when it is desired to feed the sheet of material upon which designs or stamps have been produced, so that each one will be located substantially centrally over the pattern E, at the time the blank containing it is cut, I form each projection P, or depression P', which is intended to locate any particular design on the pattern as stated, at a distance from the center of that design, equal to one and one half times the width of the desired blank. This will place the trip operating irregularities on the stock approximately, at the cutting lines between the blanks, and I also preferably locate them in the thin portion of the sheet of material, that is, that intended for the shanks of the soles, and a little out of the line of the designs or designating stamps which are usually formed upon that portion of shoe soles. These definite irregularities upon the surface of the material may however be otherwise located with reference to the ornamental or designating figures, even being placed immediately beside each figure, and the trip or releasing device be adjusted to correspond with such location of these actuating devices.

In practice the blanks are cut somewhat wider than the widest part of the finished sole, and the normal stroke of the ratchet lever K is sufficient to feed a little greater amount of stock than is needed for the widest blank; but with my improvements the length of the period of each intermittent feeding operation is dependent upon the continuation of the contact of the driving-disk 24 with the feeding drum J, and therefore each time that the drum has been turned sufficiently to bring one of the projections or depressions upon the stock, in contact with the trip, it will release the mechanism which keeps the spring 19 compressed, and permit it to withdraw the driving-disk 24 from one end of the drum and apply the brake-disk at the other; thus stopping the drum and holding it in this fixed position until the lever K, has completed its forward movement, and enough of its backward movement to again bring the cam surface 16 into contact with the friction roll 17, which will reverse the contact of the two disks, again compress the spring 19 and cause it to be held in that condition by the locking devices 32, 33, until again released by the passage of a projection P beneath the trip.

I claim—

1. In a machine for cutting articles from sheet material the combination of stock-feeding mechanism; driving mechanism therefor; a locking-device to hold the said feeding and driving mechanism in engagement; and mechanism connected to said locking-device which is held in the path of movement of definite irregularities formed upon the material, whereby the said device is adapted to be unlocked by the operation of the moving material, substantially as described.

2. In a machine for cutting articles from sheet material, the combination of a feed-roll; driving mechanism therefor; a locking-device to hold said roll and driving mechanism in engagement, and a trip to release said locking-device, which is in the path of movement of definite irregularities upon the moving material and is adapted to be operated thereby when said material is being fed, substantially as described.

3. In a machine for cutting sheet material, a feed-roll free to rotate upon its driving shaft, mechanism to rotate said shaft and periodically couple it with said roll, a lock to hold them in couple, and a trip to release them, which is in the path of movement of definite irregularities on the material and is adapted to be automatically operated thereby at predetermined intervals when the material is fed, substantially as described.

4. In a machine for cutting sheet-material, a feed-roll loose upon its driving shaft, a clutch which periodically couples said roll and shaft, a clutch-release located in the path of definite irregularities upon the material by which it is adapted to be operated when the material is being fed, a brake for said feed roll, and mechanism to withdraw said clutch and apply the brake when the clutch-release is operated, substantially as described.

5. In a machine for cutting sheet material, a feed-roll, a shaft therefor which carries a driving-clutch and a brake-clutch, to successively operate upon said feed-roll, mechanism to reciprocate the said shaft and clutches, a locking-device to hold the driving clutch and roll in contact, and a trip to release them, which is located with respect to the specially formed surface upon the material in a position to adapt it to be operated thereby when the material is fed, substantially as described.

6. In a machine for cutting articles from sheet material having ornamental or distinguishing figures upon its surface, one of which figures is to be contained upon each article; mechanism to support and feed said material, and mechanism adapted to arrest the movement of said feeding mechanism independently of other operating parts of the machine, a part of which arresting mechanism is held in the path of movement of definite variations in the surface of the material and regularly located thereon with respect to said distinguishing figures, whereby said feed-arresting devices will be operated at prescribed intervals by said material when it is fed, substantially as described.

7. In a machine for cutting sheet material which is provided with a blank cutter made adjustable to vary the size of blanks, a feed-controlling attachment which is adapted to be operated by a portion thereof held in the path of movement of definite variations in the surface of the material, which is being fed, and a lever support for said feed-controlling attachment, which has its fulcrum in a fixed portion of the machine and is pivotally connected with the blank-cutter frame, substantially as described for the purpose specified.

8. In a machine for cutting shoe soles from sheet material, a pattern to support the material and determine the form of the sole, a feeding apron to move the material to the pattern, a guide to act upon the offset between the thin and thick portions of the sheet, and an angularly placed roll to draw the offset against the guide, whereby the material will be definitely fed upon said pattern, substantially as described.

9. In a machine for cutting soles from sheets of india-rubber, which is organized with a stock supporting pattern, and blank-cutting mechanism, the combination with the feeding apron of a pair of trimming knives located one upon each side of the said apron and which are adjustable toward and from one another; a guide to act upon the offset upon said sheet, and a roll to draw said offset against said guide, substantially as described.

10. In a machine for cutting articles from sheet material the combination of stock-feeding mechanism and driving mechanism therefor; locking-mechanism to hold the said feeding and driving mechanism in engagement, and a trip to release them, which is supported near the surface of the sheet of material, and a series of trip actuating devices carried by the material and located in a position to operate said trip when the material is fed.

11. In a machine for cutting articles from sheets of plastic material which have ornamental or designating figures upon their surface and one of which figures is to be contained upon each article; the combination of a series of definite projections or depressions carried with said material and respectively regularly located with relation to said ornamental figures thereon; mechanism to support and feed said material, and feed arresting mechanism having an actuating device located in the path of movement of said projections or depressions, and adapted to be operated thereby when they are advanced by the feeding mechanism, whereby each ornamental figure will be properly placed in the machine before each article is cut.

HERBERT B. STEELE.

Witnesses:
A. J. BURROW,
T. J. CUNNINGHAM.